(No Model.)

P. K. DEDERICK.
INCASED BALE OF COTTON OR LIKE MATERIAL.

No. 457,634. Patented Aug. 11, 1891.

Witnesses
F. L. Smith
Thomas Durant.

Inventor
Peter K. Dederick
by
Church & Church
his Attorneys

UNITED STATES PATENT OFFICE.

PETER K. DEDERICK, OF LOUDONVILLE, NEW YORK.

INCASED BALE OF COTTON OR LIKE MATERIAL.

SPECIFICATION forming part of Letters Patent No. 457,634, dated August 11, 1891.

Application filed February 12, 1889. Serial No. 299,620. (No model.)

*To all whom it may concern:*

Be it known that I, PETER K. DEDERICK, of Loudonville, in the county of Albany and State of New York, have invented certain new and useful Improvements in Incased Bales of Cotton or Like Material; and I do hereby declare the following to be a full, clear, and exact description of the same, reference being had to the accompanying drawings, forming a part of this specification, and to the letters of reference marked thereon.

My invention relates to the casing or covering of bales of cotton or other like combustible material baled for transportation or storage; and it consists in certain novel details of construction to be hereinafter described, and pointed out particularly in the appended claim.

Figure 1:
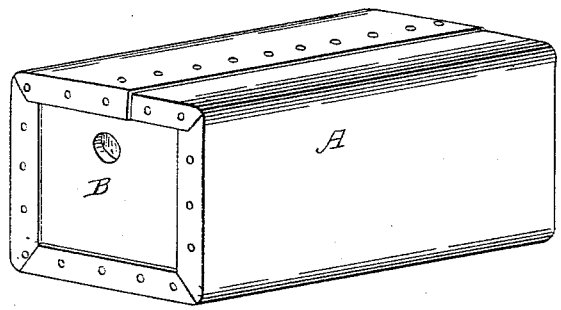
Figure 2:
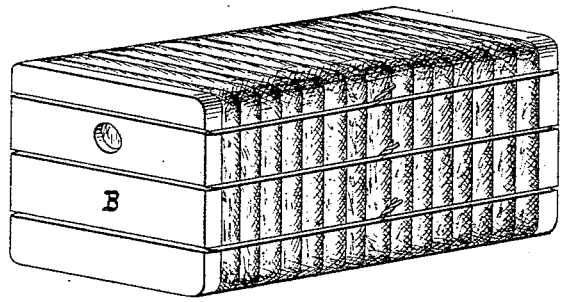
Figure 3:
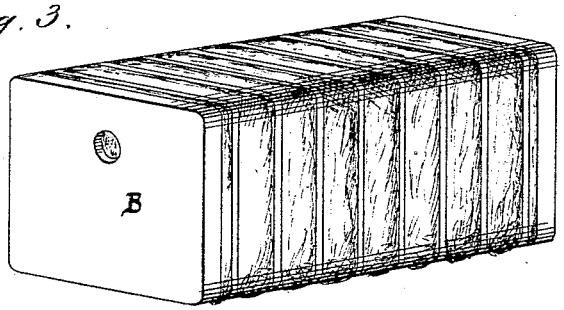

Figure 1 represents a bale covered by my improved method. Fig. 2 represents the bale from the new style or continuous press before covering, the wooden heads being preferably bound under the bands. Fig. 3 represents the old-style form of cotton bale with the wooden heads placed at each end, the same to be secured by the covering when put on.

Similar letters represent similar parts.

A, Fig. 1, represents the sheet-metal covering, which should surround the bale, covering the larger sides, and may be formed from one or more sheets riveted to otherwise secured together to form a casing or covering. B represents the wooden heads, one at each of the smaller sides or ends of the bale. Each may be simply a piece of board or formed of pieces nailed together, so as to cross the grain for greater strength. For the purpose of sampling the cotton a hole may be bored through these heads, as shown.

Fig. 2 represents a bale of form and construction as from the new-style press. (Shown in Letters Patent granted me October 29, 1872, Nos. 132,566 and 132,639.) As shown, the bale is bound endwise, and for greater security the wooden heads may be bound under the bands or in with the bale, as shown, which can be conveniently done with the form of press alluded to, and in which case the metal covering requires no securing to the wooden head, being simply a sleeve covering the bale and edges of the heads. If the heads are not bound with the bands, as shown in Fig. 2, then to better secure the said heads the sheet-metal covering should not only cover the edges of the heads, but lap over and be nailed on the sides of the heads, as shown in Fig. 1. When under the bands, the wooden heads may be grooved for the bands in order to protect them by allowing them to fall below the surface within the grooves or slots. They would thus also serve to pass the ties in the press.

Fig. 3 represents the old-style of bale bound around the short way with the fiber lengthwise of the bale. This bale may be bound with bands or secured by the metal covering without the use of other bands. The wooden heads are placed at the ends of the bale and secured by the metal covering overlapping and nailed to the edges of the head or overlapping the edges and nailed to the sides, as shown in Fig. 1.

The bale shown in Fig. 3 might also be secured without the use of bands by overlapping the edges of the metal covering and firmly nailing them to the sides of the wooden head, as shown in Fig. 1.

The wooden heads might be used on the top and bottom of Fig. 3 instead of the ends and under the bands, if desired.

Having thus fully described my invention, what I claim, and desire to secure by Letters Patent, is—

The combination, with a bale of pressed cotton, of wooden heads substantially such as described, and a covering or case consisting of a sheet of metal applied around the bale and having its ends overlapped and secured by rivets or otherwise and having turned-down portions secured to the said wooden heads, as set forth.

PETER K. DEDERICK.

Witnesses:
R. J. VAN SCHOONHOVEN,
CYRUS R. DEDERICK.